United States Patent [19]
Daly

[11] Patent Number: 6,120,046
[45] Date of Patent: Sep. 19, 2000

[54] HYDRAULIC TORSIONAL DAMPER FOR A STEERING SYSTEM

[75] Inventor: Mark Allen Daly, Novi, Mich.

[73] Assignee: Ford Global Technologies, Inc., Dearborn, Mich.

[21] Appl. No.: 09/178,587

[22] Filed: Oct. 26, 1998

[51] Int. Cl.[7] .................................. F16F 1/16; B62D 1/16
[52] U.S. Cl. .............................. 280/90; 74/492; 267/273; 464/180
[58] Field of Search ................................ 280/90, 93.513, 280/779; 74/492; 267/273; 464/180

[56] References Cited

U.S. PATENT DOCUMENTS

| | | | |
|---|---|---|---|
| 1,572,519 | 2/1926 | Davis ......................................... | 74/492 |
| 1,799,662 | 4/1931 | Weiss . | |
| 2,234,975 | 3/1941 | Newhart .................................... | 280/90 |
| 2,268,968 | 1/1942 | Stinne . | |
| 3,911,759 | 10/1975 | Tanaka et al. ............................. | 74/492 |
| 4,352,304 | 10/1982 | Warner . | |
| 4,566,712 | 1/1986 | Motrenec . | |
| 5,090,521 | 2/1992 | Miura . | |
| 5,123,633 | 6/1992 | Kanda . | |
| 5,272,933 | 12/1993 | Collier et al. . | |
| 5,516,133 | 5/1996 | Motrenec et al. . | |

FOREIGN PATENT DOCUMENTS

| | | |
|---|---|---|
| 825656 | 11/1936 | France . |
| 62-12467 | 1/1987 | Japan . |

*Primary Examiner*—J. J. Swann
*Assistant Examiner*—Christopher Bottorff
*Attorney, Agent, or Firm*—Gregory P. Brown

[57] ABSTRACT

A torsional damper significantly reduces vibrations in a steering system of a motor vehicle. The torsional damper (12) includes a housing (30) defining an interior (42) and flanges (34) for secure attachment to a structural member (28) of the motor vehicle. The torsional damper also includes a pump (78) driven by rotational movement of a steering shaft. The housing includes first and second chambers (120, 124) disposed within the interior and in fluid communication with the pump and each other through a fluid track (60). The housing also includes a diaphragm partitioning the first and second chambers and a predetermined stiffness. The fluid track is sized so as to establish a critical frequency above which steering shaft cyclic rotational motions are attenuated and below which steering shaft cyclic rotational motions are unaffected.

11 Claims, 3 Drawing Sheets

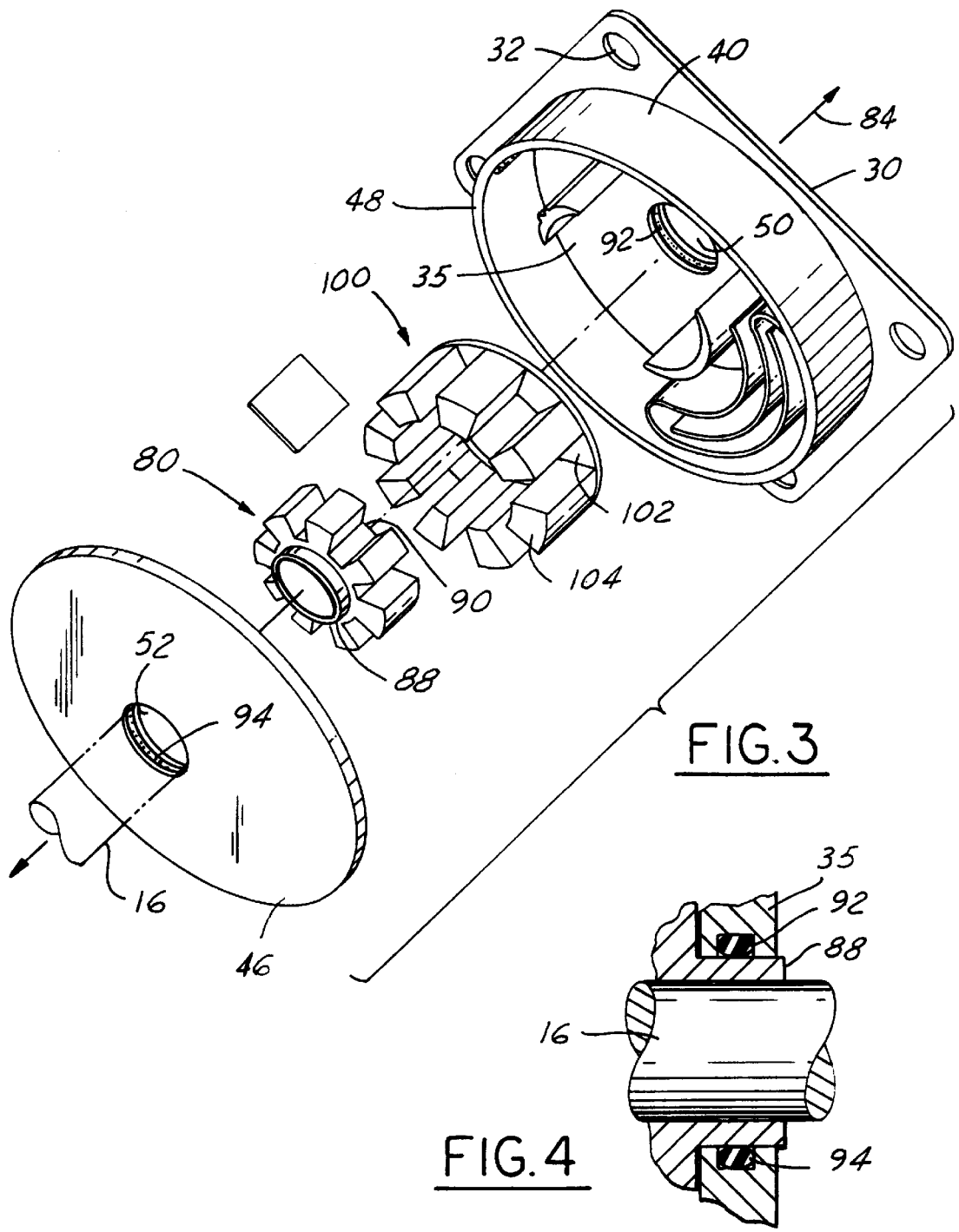

HYDRAULIC TORSIONAL DAMPER FOR A STEERING SYSTEM

BACKGROUND OF THE INVENTION

1. Field of the Invention

This invention relates generally to hydraulic steering dampers for use on motor vehicle steering systems for reducing undesirable vibrations therein. More particularly, the present invention relates to a torsional hydraulic damper for reducing steering system vibrations.

2. Disclosure Information

Steering system vibrations have challenged vehicle designers for years. Often these vibrations are exhibited to a vehicle operator in the form of an oscillating steering wheel. Many solutions have been proposed to reduce steering system vibrations, including adding friction to the steering system. These solutions frequently have a deleterious effect on some other suspension or steering system attribute. Adding friction, for instance, degrades the steering feel the steering system presents to the operator.

Another approach to reducing steering system vibrations has been to add steering dampers, much like a vehicle shock absorber as used in a vehicle suspension. These steering dampers are attached at one end to a lateral link in the steering system, such as a drag link and to the vehicle structure, such as a cross member, at the other end. Of course, the dampers have to be large enough to accommodate the steering system travel, which can make them heavy and costly. While it has been observed that these dampers are effective for attenuating very low frequency vibrations, they are not as effective at controlling higher frequency vibrations (10–20 Hz), especially at low amplitudes. Furthermore, they tend to add considerable friction to the steering system, causing it to feel heavy and numb to operators.

It would therefore be desirable to provide a steering damper capable of dampening higher frequency vibrations while not limiting the rotational travel of the steering system and not changing the feel of the steering system when the vibration control is not required.

SUMMARY OF THE INVENTION

According to the present invention, a torsional hydraulic damper has been discovered which reduces unwanted rotational vibrations in a steering shaft. Accordingly, the torsional hydraulic damper includes a housing defining an interior and flanges for secure attachment to a structural member of the motor vehicle. The torsional damper also includes a pump driven by rotational movement of a steering shaft. The housing includes first and second chambers disposed within the interior and in fluid communication with the pump and each other through a fluid track. The housing also includes a diaphragm partitioning the first and second chambers and a predetermined stiffness. The fluid track is sized so as to establish a critical frequency above which steering shaft cyclic rotational motions are attenuated and below which steering shaft cyclic rotational motions are unaffected.

Advantageously, the torsional damper allows unlimited rotational travel, significant damping at and above a specified or predetermined frequency and almost no effect on low frequency rotational movement.

BRIEF DESCRIPTION OF THE DRAWINGS

FIG. 3 is an exploded view of a hydraulic torsional damper constructed in accordance with the present invention.

FIG. 4 is partial sectional view taken along lines 4—4 illustrating a feature of a hydraulic torsional damper constructed in accordance with the present invention.

DETAILED DESCRIPTION OF THE PREFERRED EMBODIMENT

Figure 1:
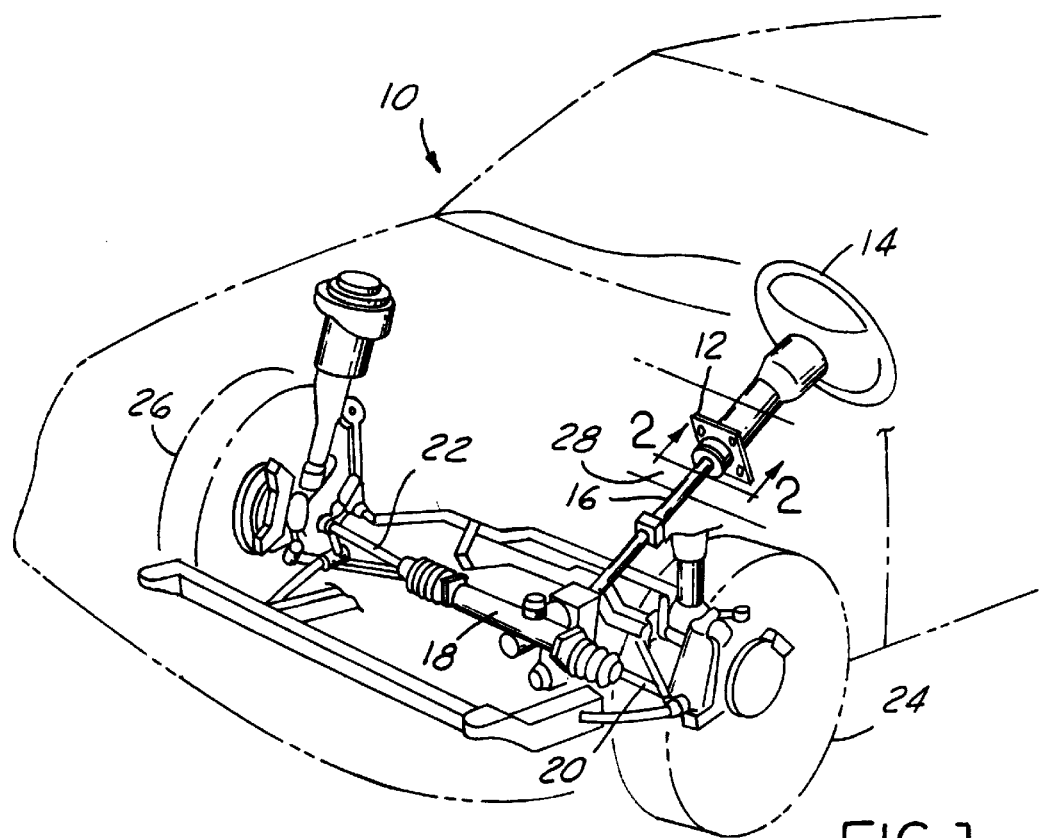
FIG. 1 is an perspective view of a motor vehicle having a hydraulic torsional damper installed in a steering system in accordance with the present invention.

Referring now to FIG. 1, a motor vehicle 10 having a steering system and a hydraulic torsional damper 12 is shown. The steering system includes a steering wheel 14 allowing an operator to command the steering system and a steering shaft 16 interconnecting the steering wheel to a steering gear 18. A pair of tie rods 20, 22 connect the steering gear 18 to steerable road wheels 24, 26. The steering system operates to translate rotation of the steering wheel into translation of the tie rods, which in turn rotate the steerable wheels 24, 26 about their steering axes. The hydraulic torsional damper 12 is secured to a structural component of the motor vehicle, such as the dash panel 28 or any other structural component capable of securing the damper 12 from rotation as the steering shaft 16 is rotated.

Figure 2:
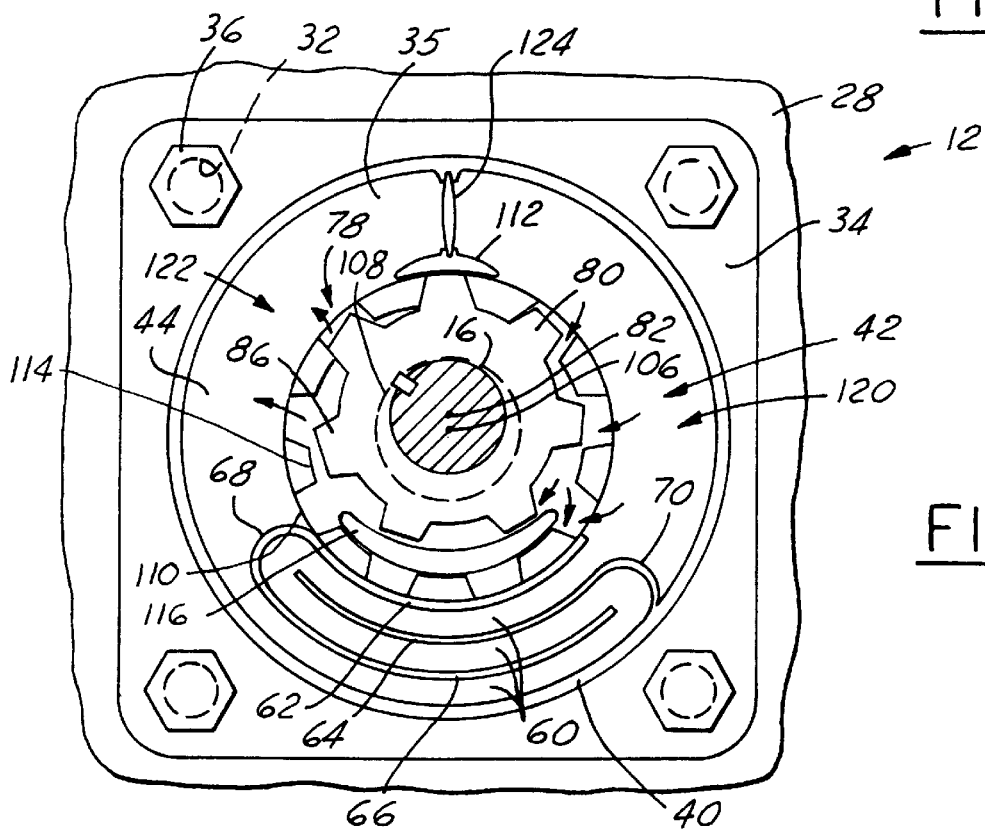
FIG. 2 is a sectioned view of a hydraulic torsional damper constructed in accordance with the present invention.

Referring now to FIGS. 2 and 3, the hydraulic torsional damper 12 includes a housing 30 having four mounting apertures 32 disposed on an outer flange 34, extending from a planar portion 35 of the housing, for receiving threaded fasteners 36 therethrough to allow secure attachment of the hydraulic torsional damper to the dash panel 28. Of course, many alternatives for exist to provide this attachment, including different types of fasteners and weldments, that provide equivalent functionality and operability.

The housing also includes a cylindrical outer wall 40 projecting axially outward from the planar portion 35. The outer wall 40 defines an interior 42 of the housing for containing a hydraulic fluid 44. The housing includes a cover 46 which attaches to an end 48 of the outer wall 40. This attachment may be by press fitting, welding or bonding, as well as other methods which provide a sealed relationship between the outer wall end 48 and the cover 46 for maintaining the hydraulic fluid 44 within the interior 42 of the housing. In the presently preferred embodiment, the planar portion of the housing includes a first shaft aperture 50 and the cover of the housing includes a second shaft aperture 52.

The interior 42 of the housing also includes a fluid track 60 defined by the cooperation of the planar portion 35 and the cover 46 in combination with first, second and third arcuate wall portions 62, 64, 66 formed substantially parallel to the outer wall and first and second u-portions 68, 70. The first u-portion 68 interconnects the first and third wall portions 62, 66 and the second u-portion 70 interconnects the second wall portion 64 and the outer wall 40. This fluid track defines a fluidic volume, which when filled with a specified hydraulic fluid, provides a column of hydraulic fluid of a predetermined mass. This being the case, the length and actual shape of the fluid track could take many forms while providing the principle function of providing a predetermined mass of hydraulic fluid within the fluid track.

The interior of the housing contains a hydraulic pump 78, which in the presently preferred embodiment is of the positive displacement type. The pump includes an inner rotor 80 keyed to the steering shaft 16 such that a first center 82 of the inner rotor is coincident with and rotates about a longitudinal axis 84 of the steering shaft. The inner rotor includes seven radially extending inner teeth 86 and axial projecting sealing shoulders 88, 90 for sealing engagement with housing seal 92 located in the first aperture 50 and a cover seal 94 disposed in the second aperture 52.

The hydraulic pump also includes an outer rotor 100 which includes a planar ring portion 102 having nine radially projecting outer teeth 104 for meshingly engaging the inner teeth 86. It should be noted the outer rotor will generally have more teeth than the inner rotor, the number being a function of the difference in diameter of the inner and outer rotor and the size of the teeth. The outer rotor includes a second center 106 offset from the first center 82 of the inner rotor and an outer rotor aperture 108 larger than the steering shaft to allow free rotation taking into account the offset centers. An outer periphery 110 of the outer rotor is guided by the first wall portion 62 and a first arcuate guide 112 disposed opposite from the first wall portion 62. Additionally, an inner periphery 114 of the outer rotor is guided by a second arcuate guide 116.

The second arcuate guide, being in a substantially sealed relationship with the inner and outer teeth 86, 104 functionally separates the interior of the housing into first and second chambers 120, 122. Definition of the chambers 120, 122 is completed by the inclusion of a diaphragm 124 extending between the first arcuate guide 112 and the outer wall 40. Generally speaking, the first and second chambers are of equivalent volume and in fluid communication with one another through the fluid track 60 as well as the pump 78. As the pump rotates, the voids between the inner and outer teeth act as passages for fluid flow between the first and second chambers.

The diaphragm 124 has a predetermined stiffness to flexing under pressure in generated in either the first or second chamber. The selection of the stiffness is yet another parameter to be selected based on the application.

Operation of the present invention will now be described for a clockwise rotation of the steering wheel 14. As viewed in FIG. 2, the inner rotor 80 rotates counterclockwise with the steering shaft 16. For purposes of clarity, reference will be made to the pump and housing as they would relate to an analog clock. As the inner rotor rotates, the inner teeth at the one o'clock position begin to withdraw from between the outer teeth on the outer rotor. Fluid from the first chamber flows into the opening thus created. This continues down to the four o'clock position, where the inner and outer rotors first engage the second arcuate member. At this position, the inner and outer teeth are completely separated and as they pass onto the second arcuate member, they lock the fluid between teeth and carry the fluid toward the second chamber. When the teeth get to the seven o'clock position, they begin to dump their fluid into the second chamber. At the eleven o'clock position, the inner teeth on the inner rotor nearly completely engaged the outer teeth on the outer rotor, forcing the fluid into the second chamber. This action is generally known as a positive displacement pump.

Depending on the frequency at which the steering shaft rotated, the fluid will travel in one of two principle modes. For low frequency excursions, the fluid is transferred from the one chamber to the other via the pumping action described, and pressure is relieved in the pressurized chamber by fluid traveling back to the lower pressure chamber through the fluid track. At the lower frequency rotations, the existence of the torsional hydraulic damper is not detectable and allows unlimited rotational travel.

The other mode exists under high frequency steering shaft rotations. The transition between low and high frequency modes is tunable based on the mass of fluid in the fluid track, which is a function of the fluidic volume and the hydraulic fluid selected, and the selected stiffness of the diaphragm. Essentially, the transition point occurs when the mass of the oil resonates on the stiffness of the diaphragm. In the high frequency mode, the inertial effects of the fluid become quite large and fluid no longer transfers from one chamber to the other chamber through the fluid track. The fluid in the fluid track effectively becomes a plug to flow driven by rotations above the specific frequency. This forces the oil expelled from the pump to displace the diaphragm, which effectively adds a stiff spring between the steering shaft and the dash panel.

Figure 5:
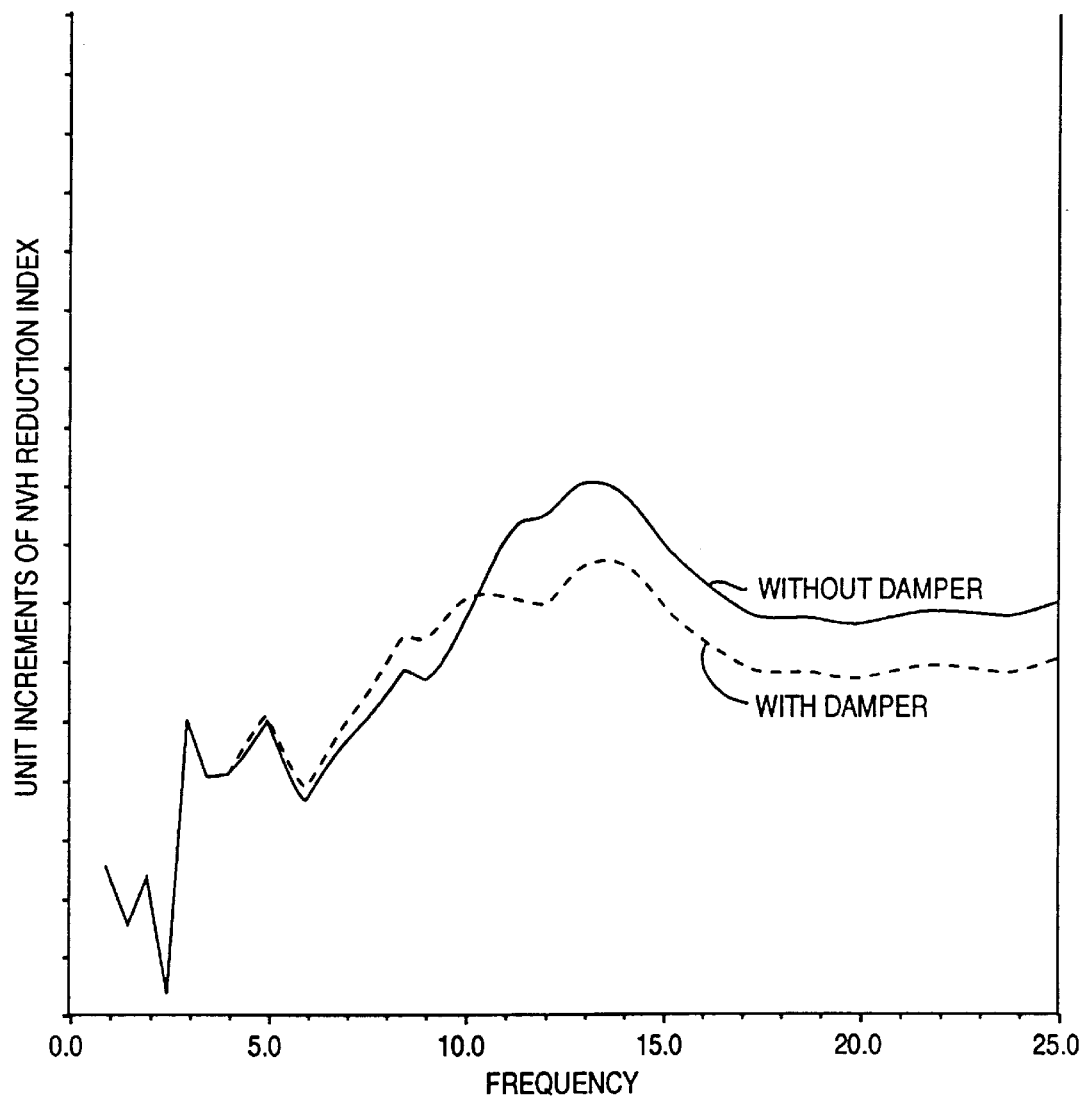
FIG. 5 is graphical plot comparing a vehicle with and without a hydraulic torsional damper installed in accordance with the present invention.

FIG. 5 shows the effect of using a torsional hydraulic damper on a vehicle steering system. The bottom axis represents the rotational frequency of the steering shaft and the left axis represents a subjective rating showing the reduction in objectionable vibrations of the steering system. In the presently preferred embodiment, using a fluid having a density of 900 kg/m^3 and a fluid track having a volume of 17.8 cc and a diaphragm having a stiffness of 1600 N/mm, the transitional frequency was approximately ten hertz. Above this frequency the steering system vibrations are substantially attenuated.

The foregoing description presents a the preferred embodiment of the present invention. Details of construction have been shown and described for purposes of illustration rather than limitation. For instance, it should be recognized that the torsional hydraulic damper does not need to be mounted such that the steering shaft extends therethrough, rather, a mechanical drive such as a chain could be used to improve packageability. Additionally, the torsional hydraulic damper may be mounted at any position along the steering shaft between the steering wheel and the transverse steering rack, including within the steering gear and valve assembly while providing equivalent functionality and operability. Other modifications and alterations of the invention will no doubt occur to those skilled in the art that will come within the scope and spirit of the following claims.

What is claimed:

1. A torsional damper apparatus for reducing vibrations a motor vehicle steering system having a steering shaft with a longitudinal axis, said torsional damper apparatus comprising:

a housing defining a sealed interior and being adapted to be securely attached to a structural member of the motor vehicle;

a pump driven by rotational movement of a steering shaft;

a first chamber disposed within said interior and in fluid communication with said pump;

a second chamber disposed within said interior and in fluid communication with said pump;

a fluid track disposed within said interior and having a predetermined fluidic volume, said fluid track interconnecting said first and second chambers; and a diaphragm partitioning said first and second chambers and having a predetermined stiffness;

whereby said fluidic volume of said fluid track is selected so as to establish a critical frequency above which steering shaft cyclic rotational motions are attenuated and below which steering shaft cyclic rotational motions are unaffected.

2. The torsional damper apparatus according to claim 1, wherein said pump is disposed within said interior of said housing.

3. The torsional damper apparatus according to claim 1, wherein said pump further comprises:

an inner rotor rotatably disposed within said interior, said inner rotor having a first center coincident with a center of said steering shaft and attached thereto for rotation about said longitudinal axis of said steering shaft; and an outer rotor rotatably disposed within said interior, said outer rotor having a second center offset from said first center of said inner rotor, said inner and outer rotors being operatively engaged so as to displace fluid between first and second chambers directly proportional to rotational movement of said steering shaft.

4. The torsional damper apparatus according to claim 3, wherein said housing further comprises first and second arcuate guides being operative to guide rotations of said outer rotor.

5. The torsional damper apparatus according to claim 3, wherein said fluid track further comprises:

first, second and third arcuate wall portions parallel to a housing outer wall, said first wall portion being adjacent to an outer periphery of said outer rotor;

a first u-portion interconnecting said first and third wall portions; and a second u-portion interconnecting said housing outer wall portion with said second wall portion opposite from said first u-portion.

6. A torsional damper apparatus for reducing vibrations in a motor vehicle steering system having a steering shaft with a longitudinal axis, said torsional damper apparatus comprising:

a housing adapted to be securely attached to a structural member and having a first shaft aperture therein;

a cover for attachment to said housing and having a second shaft aperture, said housing and said cover defining a sealed interior;

a pump within said interior and having first and second ports, said pump being driven by rotational movement of said steering shaft;

a first chamber within said interior and in fluid communication with said first port of said pump;

a second chamber within said interior and in fluid communication with said second port of said pump;

a fluid track within said interior and having a predetermined fluidic volume and interconnecting said first and second chambers; and a diaphragm separating said first and second chambers and having a predetermined stiffness;

whereby said fluid track is selected so as to establish a critical frequency above which steering shaft motions are attenuated and below which steering shaft motions are unaffected.

7. The torsional damper apparatus according to claim 6, wherein said pump further comprises:

an inner rotor rotatably disposed within said interior, said inner rotor having a first center coincident with a center of said steering shaft and attached thereto for rotation about said longitudinal axis of said steering shaft; and an outer rotor rotatably disposed within said interior, said outer rotor having a second center offset from said first center of said inner rotor, said inner and outer rotors being operatively engaged so as to said displace fluid between first and second chambers in response to rotational movement of said steering shaft.

8. The torsional damper apparatus according to claim 7, wherein said housing further comprises first and second arcuate guides being operative to guide rotations of said outer rotor.

9. The torsional damper apparatus according to claim 7, wherein said fluid track further comprises:

first, second and third arcuate wall portions parallel to a housing outer wall, said first wall portion being adjacent to an outer periphery of said outer rotor;

a first u-portion interconnecting said first and third wall portions; and a second u-portion interconnecting said housing outer wall portion with said second wall portion opposite from said first u-portion.

10. A torsional damper apparatus for reducing vibrations in a motor vehicle steering system having a steering shaft with a longitudinal axis, said torsional damper apparatus comprising:

a housing defining a sealed interior and having a first shaft aperture therethrough and first and second arcuate guides, said housing being adapted to be securely attached to a structural member of the motor vehicle;

an inner rotor rotatably disposed within said interior, said inner rotor having a first center coincident with a center of said steering shaft and attached thereto for rotation about said longitudinal axis of said steering shaft;

an outer rotor rotatably disposed within said interior, said outer rotor having a second center offset from said first center of said inner rotor and having an outer periphery adjacent to said first arcuate guide and an inner periphery adjacent to said second arcuate guide, said inner and outer rotors being operatively engaged so as to displace fluid through first and second ports in response to rotational movement of said steering shaft;

a first chamber within said interior and in fluid communication with said first port;

a second chamber within said interior and in fluid communication with said second port;

a fluid track having a predetermined fluidic volume and interconnecting said first and second chambers; and a diaphragm partitioning said first and second chambers and having a predetermined stiffness;

whereby said fluid track is selected so as to establish a critical frequency above which steering shaft cyclic rotational motions are attenuated and below which steering shaft cyclic rotational motions are unaffected.

11. The torsional damper apparatus according to claim 10, wherein said fluid track further comprises:

first, second and third arcuate wall portions parallel to a housing outer wall, said first wall portion being adjacent to said outer periphery of said outer rotor;

a first u-portion interconnecting said first and third wall portions; and a second u-portion interconnecting said housing outer wall portion with said second wall portion opposite from said first u-portion.

* * * * *